Oct. 22, 1963

W. R. BACKER 3,107,459

AUTOMATIC BALANCING MEANS

Filed July 21, 1960

INVENTOR
WILLIAM R. BACKER

BY *Lewis M. Smith, Jr.*
ATTORNEY

Oct. 22, 1963  W. R. BACKER  3,107,459
AUTOMATIC BALANCING MEANS
Filed July 21, 1960  3 Sheets-Sheet 2

INVENTOR
WILLIAM R. BACKER
BY Lewis M. Smith, Jr.
ATTORNEY

Fig. 5

INVENTOR
WILLIAM R. BACKER
BY
Lewis M. Smith
ATTORNEY

United States Patent Office 3,107,459
Patented Oct. 22, 1963

3,107,459
AUTOMATIC BALANCING MEANS
William R. Backer, Holden, Mass., assignor to Norton Company, Worcester, Mass., a corporation of Massachusetts
Filed July 21, 1960, Ser. No. 44,435
7 Claims. (Cl. 51—169)

The instant invention relates to automatic balancing means, and more particularly to automatic balancing means for a rotating element operable automatically under a predetermined condition while a rotating element to be balanced thereby is being rotated about a predetermined axis.

The prior art teachings relating to balancing means for rotating elements include disclosures of various arrangements by means of which a rotating element is selectively constrained for rotation about a fixed predetermined axis and alternatively released from such constraint for operation of suitable apparatus for balancing the rotating element about its axis of rotation. Typically, these arrangements call for manual control of the means for selectively constraining and releasing the rotating element.

In contrast to the prior art teachings referred to above, the instant invention contemplates apparatus including means for sensing a predetermined operating condition such as an unbalanced condition of a rotating element of a predetermined magnitude and automatically operable to initiate a cycle of operation during which a suitable balancing means is effective to balance a rotating element. In addition, the instant invention encompasses the provision of means for automatically initiating the operation of means for conditioning a rotating element immediately after completion of each balancing operation. While the automatic control means for balancing a rotating element characteristic of the instant invention is suitable for use with various different types of balancing apparatus for rotating elements, it will be described and illustrated herein in relation to one particular dynamically actuated balancing means for a rotating element representative of the various different arrangements for balancing rotating elements already well known in the art. Hence the particular balancing apparatus illustrated herein, described and claimed in copending application Serial No. 44,382 of William R. Backer et al. for Dynamically Actuated Balancing Means, filed July 21, 1960, should be considered as illustrative only and not in a limiting sense.

An object of the present invention is the provision of means for automatically initiating the operation of balancing means for an object rotating about a fixed predetermined axis.

Another object is the provision of means operable automatically in response to a predetermined operating condition to initiate sequential operation of means for balancing a rotating element about its axis of rotation and subsequent operation of means for conditioning the rotating element after it has been balanced.

Still another object of this invention is to provide means for a rotating tool such as a grinding wheel in order to balance the rotating tool about its axis of rotation while it is rotating in response to a given operating condition such as vibration at a predetermined level.

Yet another object is to provide a fully automatic arrangement for periodically balancing a grinding wheel about its axis of rotation and for truing the grinding wheel immediately after it is balanced about its axis of rotation, all in response to a predetermined operating condition.

A final object is the provision in an assembly including a rotating element supported on a suitable elongated spindle assembly for selective displacement of the rotating element between a first position in which the rotating element is rotated about a fixed predetermined axis under its normal operating condition and a second position in which the rotating element is conditioned for balancing, of means automatically operable in response to a predetermined operating condition to position the rotating element in its second position and to initiate the operation of balancing means for balancing the rotating element in its second position and thereafter operable to return the rotating element to its first position and to initiate the operation of means for further conditioning the rotating element, if necessary, when it is returned to its first position.

Other objects and advantages will become apparent from consideration of the following description of the instant invention, especially as it relates to the showing in the accompanying drawings wherein.

Figure 1:
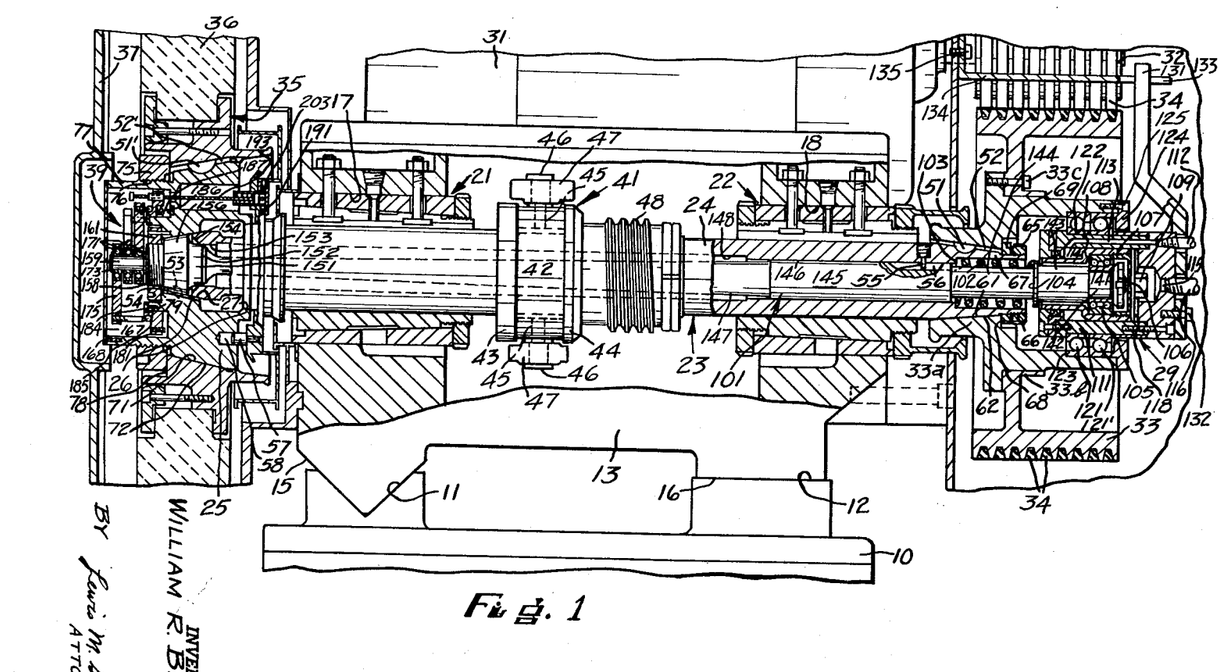
FIG. 1 is a side elevation partially broken away of a balancing means and actuating means therefor suitable for use in the preferred embodiment of the instant invention as applied to a grinding machine.

Referring now to the drawings wherein like reference numerals identify like or corresponding parts, FIG. 1 illustrates the application of the instant invention to a grinding machine including a base assembly 10 provided on its upper surface with a V-way 11 and a flat way 22 arranged to support a wheel slide assembly 13 in sliding engagement with base assembly 10 by engagement with a V-slide 15 and a flat slide 16. The wheel slide assembly 13 is provided with a pair of spaced coaxial circular openings 17 and 18 respectively arranged to receive plane radial bearing assemblies, generally designated by reference numerals 21 and 22, in turn supporting an elongated wheel spindle assembly, generally designated by the reference numeral 23, including a first longitudinally relatively fixed portion 24 and a second portion 25 relatively movable longitudinally, interfitted by means of coacting external tapered surface 26 and internal tapered surface 27 respectively formed on portion 24 and portion 25, the respective portions of spindle assembly 23 being interconnected for relative displacement by a linear actuator mechanism generally designated by the reference numeral 29 and described in further detail below.

The wheel slide assembly 13 also supports a drive motor 31 mounted thereon and provided with a drive sheave 32 disposed in alignment with a spindle sheave assembly 33 and interconnected therewith by means of a plurality of drive belts 34.

The elongated wheel spindle 23 projecting at both ends from the wheel slide assembly 13 supports the spindle sheave assembly 33 and the linear actuator mechanism 29 at one end thereof and supports a conventional wheel sleeve assembly, generally designated by the reference numeral 35, and a rotating element comprising a grinding wheel 36 secured to the wheel sleeve assembly 35, as by a wheel retaiing ring, on the other end thereof along with an automatic dynamic balancing assembly, generally designated by reference numeral 39, and described in further detail below. The grinding wheel 36 may conveniently be enclosed by a generally conventional wheel guard assembly 37 secured to the wheel slide assembly 13 by any suitable means such as attachment bolts or the like and spaced from the left hand face of the grinding wheel 36 and the spindle assembly 23, as shown in FIG. 1, to accommodate the operation of linear actuator mechanism 29 in the manner described further below.

While the conventional spindle reciprocating mechanism generally designated by reference numeral 41 forms no part of the instant invention, some elements of such a mechanism are illustrated in FIG. 1 in operable relation to the spindle assembly 23 in order clearly to indicate that the various features of the instant invention as applied to a grinding machine are fully compatible with the type of spindle reciprocating mechanism frequently incorporated in a grinding machine. The elements of a spindle reciprocating mechanism 41 illustrated in FIG. 1 include a non-rotatable sleeve 42 encircling portion 24 of spindle assembly 23 and constrained against longitudinal displacement relative to spindle assembly 23 by a pair of opposed collars 43 and 44 secured to and rotatable with portion 24 of spindle assembly 23, said sleeve 42 being provided with diametrically opposed radial openings 45 arranged to receive a pair of opposing pins 46 projecting from the respective arms 47 of a fork assembly which may be pivotally mounted for oscillation by a linkage not shown driven by a cam or eccentric not shown rotated by a worm wheel not shown in turn driven by a worm 48 secured concentrically of portion 24 of the spindle assembly 23 so that rotation of the spindle assembly 23 produces oscillation of the arms 47 of the fork assembly to effect reciprocation of the spindle assembly 23 in the bearing assemblies 21 and 22. In this arrangement sleeve 42 also serves as the thrust bearing for the spindle assembly 23. It is to be understood that the spindle reciprocating mechanism 41 may be of the type illustrated in Patents No. 1,584,717 or No. 1,808,401 or any other suitable type with the further understanding that the spindle reciprocating mechanism may be selectively activated or deactivated by suitable manual or automatic means therefor such as that illustrated in Patent No. 1,808,401 or other suitable means well known in the art.

The spindle sheave assembly 33 is secured against rotation relative to the portion 24 of spindle assembly 23 by means of a keyway 52 engaging a key 51 projecting from the portion 24 of the spindle assembly 23 and the wheel sleeve assembly 35 is secured against rotation relative to the portion 25 of spindle assembly 23 by the engagement of keyway 52' with a key 51' projecting from portion 25 of spindle assembly 23. In addition, the portion 25 of the spindle assembly 23 is secured against rotation relative to linear actuator assembly 29 by the engagement of a keyway 54 with a key 53 projecting from the left hand end of linear actuator assembly 29 as illustrated in FIG. 1, and the portion 24 of spindle assembly 23 is secured against rotation relative to the linear actuator assembly 29 by the engagement of a radially extending pin 55 with a longitudinal slot 56 formed in linear actuator assembly 29 adjacent the right hand end thereof, as illustrated in FIG. 1. Finally, since the linear actuator assembly 29 includes a substantially elongated element subject to a torsion load, the portions 24 and 25 of spindle assembly 23 are directly secured against relative rotation, when their respective tapered surfaces 26 and 27 are in engagement, by means of a drive pin 57 projecting longitudinally from a flange on portion 24 into engagement with a recess 58 formed in portion 25.

The arrangements in the illustrative embodiment of the instant invention for mounting and maintaining the spindle sheave assembly 33 and the wheel sleeve assembly 35 in the desired orientation coaxial with and longitudinally of the spindle portions 24 and 25, respectively, will be described below.

First, the spindle sheave assembly 33, including a hub portion 33a and a replaceable rim portion 33b secured thereto by suitable attachment bolts 33c, is mounted upon the spindle assembly 23 by engagement of an internal tapered surface 61 on hub portion 33a with an external tapered surface 62 on spindle portion 24. The spindle sheave assembly is maintained in this longitudinal relationship by a threaded retaining nut 65 engaged with external threads 66 on a sleeve portion 67 projecting from the end of the portion 24 of the spindle assembly 23. If necessary, one or more spacers or washers 69 may be interposed between retaining nut 65 and the cooperating face 68 on the hub 33a of the sheave assembly 33.

Second, the wheel sleeve assembly 35 may conveniently be interfitted with the portion 25 of spindle assembly 23 by inter-engagement of an internal tapered surface 71 on wheel sleeve 35 with an external tapered surface 72 on the portion 25 of the spindle assembly 23. The inter-engagement of these respective parts may be maintained by a retaining nut 75 engaging external threads 76 on a relatively large sleeve portion 77 projecting from portion 25 of the spindle assembly. The retaining nut 75 may conveniently be provided with an inner face portion for direct engagement with a cooperating face 78 on the wheel sleeve assembly 35. From the showing in FIG. 1 it will be apparent that spindle portion 25 is further characterized by a relatively smaller sleeve portion projecting from portion 25 within and concentric of the relatively larger sleeve portion 77, for reasons to be noted further below in describing the semi-automatic wheel balancing assembly 39.

Continuing to refer to the showing in FIG. 1, the actuator assembly 29 includes an elongated spring rod generally designated by reference numeral 101 and a biasing spring 102 encircling a reduced portion of spring rod 101 constrained between a shoulder 103 formed on portion 24 of spindle assembly 23 and a flange 104 concentric of spring rod 101 so that the spring rod 101 is normally biased to the right, as shown in FIG. 1 to maintain the respective tapered surfaces 26 and 27 of portions 24 and 25 of spindle assembly 23 in interfitting engagement as shown in FIG. 1. The spring rod 101 also supports a double thrust anti-friction bearing assembly 105 secured to the spring rod 101 by a retaining nut 106 engaging the inner race of the bearing assembly 105. The bearing assembly 105 in turn rotatably supports a piston assembly 107 disposed concentric of the right hand end of spring rod 101 and provided with a shoulder 108 and a threaded piston face plug 109 coacting to secure the piston assembly 107 against longitudinal displacement relative to the outer race of bearing assembly 105.

The linear actuator assembly 29 also includes a cylinder assembly 111 which may conveniently be fabricated by interconnecting cooperating parts by suitable attachment means in the manner illustrated in FIG. 1. A first fluid conduit 112 attached to the cylinder assembly 111 connects with a fluid inlet passage 113 opening into a first cylinder chamber 114 at the left hand end of the cylinder assembly as shown in FIG. 1. A second fluid conduit 116 attached to cylinder assembly 111 connects with fluid inlet passage 115 opening in a second cylinder chamber 118 at the right end of cylinder assembly 111 as shown in FIG. 1.

Since the spring rod 101 is keyed to the respective portions of the spindle assembly 23 for rotation therewith while other portions of the linear actuator assembly 29 are preferably constrained against rotation for the reasons noted below, the cylinder assembly 111 is supported by a pair of opposed thrust bearing assemblies 121 and 121' with their respective inner races seated and secured in an annular groove 122 on the outer periphery of cylinder assembly 111 and with their outer races constrained between a shoulder 123 formed on the inner surface of a sleeve portion of the hub 33a and a suitable retaining ring 124 secured to the open end of the sleeve portion of hub 33a by suitable attachment bolts 125.

Inasmuch as fluid conduits 112 and 116 must remain attached to the cylinder assembly 111 for selective operation of the linear actuator assembly 29 in accordance with the teachings of the instant invention, it is considered more convenient to constrain the cylinder assembly 111 against rotation than to provide means for transferring fluid through the respective conduits from a stationary source with the cylinder assembly rotating. This constraint for the cylinder assembly 111 is provided by the cylinder assembly positioning lever 131 secured to the cylinder assembly 111 by suitable attachment bolts 132 and projecting radially therefrom as shown in FIG. 1 for engagement with a forked end portion 133 of a bracket 134 secured by attachment bolts 135 to a fixed mounting means such as a guard for the sheaves 32 and 33 and the drive belts 34 which may be secured in turn to the wheel slide assembly 13.

Noting that the spring rod 101 includes a substantial number of different portions each arranged to perform a specific function, these several portions of the spring rod 101 will now be described in order reading from right to left in FIG. 1. The relatively reduced threaded portion 141 is provided for threadable engagement with retaining nut 106. The adjacent bearing surface 142 supports the inner race of bearing assembly 105. The relatively enlarged section 143 provides a shoulder coacting with retaining nut 106 to restrain the inner race of bearing assembly 105 against longitudinal displacement relative to spring rod 101. In order to facilitate assembly of the biasing spring 102 on spring rod 101, the enlarged section 143 actually comprises a sleeve with flange 104 formed integrally therewith slidably engaging a reduced portion which conveniently may comprise an extension of bearing surface 142. The relatively reduced portion 144 is provided as noted above to accommodate the biasing spring 102. The enlarged elongated bearing surface 145 is disposed in slidable bearing relationship with an internal bearing surface 146 formed concentrically within spindle portion 24. The substantially elongated flexible portion 147 of relatively reduced cross section passes through a substantially enlarged central opening 148 in portion 24 so that there is clearance on all sides of portion 147 within the central opening 148.

Approaching the left hand end of spring rod 101 as illustrated in FIG. 1, a cylindrical boss 151 provided with a chamfered edge 152 is so disposed as to engage a cylindrical seat 153 in spindle portion 24 adjoining a chamfered face 154 at the end of spindle portion 24. The external tapered surface 156 is provided for engagement with the cooperating internal tapered surface 157 on spindle portion 25 which actually may comprise a continuation of internal tapered surface 27. The threaded portion 158 is provided to receive a retaining nut 161 for securing the spindle portion 25 in fixed longitudinal relation to the spring rod 101. The elongated bearing surface 159 formed integrally with or mounted concentrically on the threaded portion 158 of spring rod 101 is provided to support portions of the dynamic balancing assembly 39 described in detail below.

Recalling that the spindle portion 25 includes a relatively large sleeve portion 77 projecting therefrom, this sleeve portion along with a cover plate 167 secured thereto by suitable attachment bolts 168 provides a housing for portions of the semi-automatic dynamically actuated balancing assembly 39 which will be described in detail below with reference to the showing in FIGS. 1, 2, 3 and 4.

Figures 2, 3:
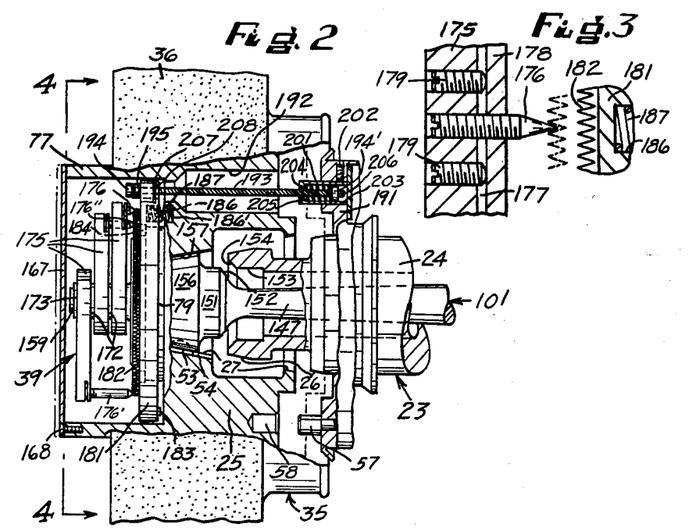
FIG. 2 is an enlarged detailed showing, partially sectioned, of a portion of the balancing means and the actuating means therefor of the preferred embodiment of the instant invention as illustrated in FIG. 1.
FIG. 3 is a detailed sectional view of a feature of the balancing means in the preferred embodiment of the instant invention, taken substantially on line 3—3 of FIG. 4.
Figure 4:
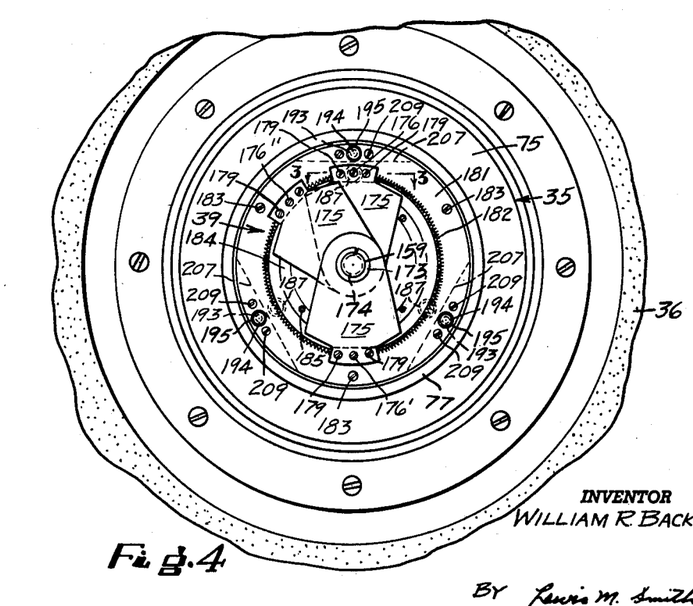
FIG. 4 is an end view, partially broken away, of a portion of the balancing means in the preferred embodiment of the instant invention, taken on line 4—4 of FIG. 2.

Three anti-friction bearing assemblies 171 positioned on bearing surface 159 by means of suitable spacers 172 and secured by a retaining ring 173 engaged in a groove 174 adjacent the outer end of bearing surface 159 provide rotatable support for three pendulum weights 175 respectively provided with pendulum locating pins 176, 176' and 176" projecting to points in a common plane perpendicular to the axis of rotation of the pendulum weights as shown best in FIG. 2. The respective pendulum locating pins threadably engaged with the respective pendulum weights 175 may conveniently be secured against displacement after they have been properly adjusted by providing a slot 177 in the end of each pendulum weight to form a resilient leaf 178 which may be engaged by a pair of lock screws 179 in the manner best illustrated in FIG. 3. With this arrangement tightening lock screws 179 against the leaf 178 applies a load on the threads of the locating pin 176 so that it cannot be accidentally displaced from its proper position relative to the pendulum weight 175 in which it is mounted. From consideration of the showings in FIGS. 2 and 4, it will be apparent that the disposition of locating pins 176' and 176" is such as to preclude disposing the respective pendulum weights 175 in alignment on a single radius. This feature combined with the presence of three weights in this device precludes rendering the dynamic balancing assembly 39 inoperable by any chance adverse disposition of the weights.

The respective pendulum weights 175 are normally constrained against rotation on the bearing assemblies 171 by a locking ring 181 slidably mounted on the external surface of the relatively small sleeve portion 79 of spindle portion 25 and including an annular serrated portion 183, formed integrally therewith or mounted coaxially thereon, normally effective when disposed in the position indicated in dotted lines in FIG. 3 to constrain the respective pendulum weights 175 against rotation by engagement with the exposed ends of the respective pendulum locating pins 176, 176' and 176". The displacement of the locking ring 181 to the right on sleeve 79 is limited by a plurality of threaded adjustable stop screws 183 projecting therefrom and the movement of the locking ring 181 to the left on sleeve 79 is limited by a retaining flange 184 secured to the open end of sleeve 79 by a plurality of suitable attachment screws 185. The locking ring 181 is provided with a plurality of recesses 186 to receive a corresponding plurality of biasing springs 187 interposed between the locking ring 181 and the spindle portion 25, so that the serrated portion 182 of locking ring 181 is normally biased into the position shown in FIGS. 1 and 2 and in dotted lines in FIG. 3 to engage and restrain the pendulum locating pins projecting from the respective pendulum weights 175.

Noting that the locking ring should be constrained against rotation relative to the spindle portion 25 on which a rotating element such as a grinding wheel 36 is mounted, this constraint is provided in the illustrative embodiment of the instant invention by the inclusion of suitable recesses 186' in alignment with the respective recesses 186 in locking ring 181 to receive the other ends of the respective biasing springs 187. With this arrangement, the respective springs 187 serve also as resilient driving pins to maintain a constant angular relationship between the locking ring 181 and the spindle portion 25. For most applications this arrangement is sufficient. However, if further constraint is necessary in certain applications, this can be supplied readily by providing interfitting splines on the sleeve portion 79 and the locking ring 181, or by providing interfitting pins and recesses in the respective parts corresponding to the arrangement of drive pin 57 and recess 58 illustrated in FIGS. 1 and 2.

The locking ring 181 is controlled by a plurality of assemblies connected to a flange 191 secured to or formed integrally with spindle portion 24 and passing through a corresponding plurality of longitudinally extending openings 192 through spindle portion 25. Each of these assemblies includes a length of flexible cable 193, end fittings 194 and 194' secured to the respective ends of the flexible cable 193, an adjustable sleeve 195 engaging end fitting 194 and threadably engaged in the locking ring 181, a socket 201 secured by a suitable set screw 202 in a suitable recess 203 in flange 191, and provided with an opening 204 in the end thereof to receive the flexible cable 193 so that the end fitting 194' may be biased against a fixed reference stop pin 206 by means of a biasing spring 205 relatively much heavier than the biasing springs 187. Each adjustable sleeve 195 threadably engaged in locking ring 181 may be secured in the desired position by providing a slot 207 in the periphery of locking ring 181 to form a resilient leaf 208 engaged by a pair of lock screws 209 in a manner corresponding to the arrangement illustrated in FIG. 3 for securing the respective pendulum locating pins. The locking arrangement for the respective adjustable sleeves 195 is best illustrated by the showing in FIG. 4.

Figure 5:
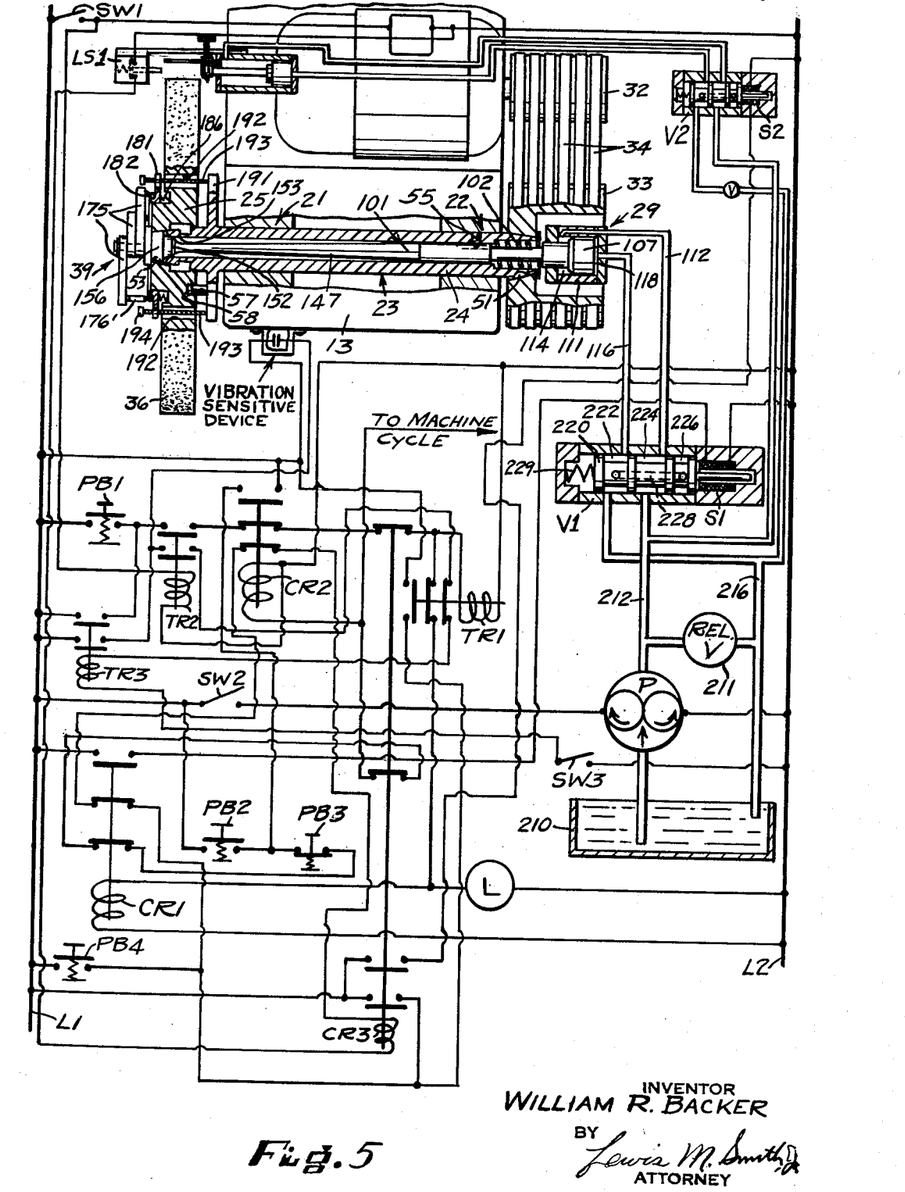
FIG. 5 is a simplified schematic representation of the preferred embodiment of the instant invention including the automatic control means therefor comprising vibration sensing means shown in operative relation to the requisite electrical circuit and hydraulic system for selective automatic and semi-automatic operation of the balancing means illustrated, according to the teachings of the instant invention.

The arrangement of the apparatus necessary to selectively semi-automatically and automatically initiate and automatically complete a balancing operation and a subsequent truing operation according to the teachings of the instant invention is best illustrated by the simplified schematic representation in FIG. 5.

A sump or reservoir 210 contains a supply of suitable pressure fluid for circulation through pressure conduit 212 by operation of a suitable pump P driven by means such as an electric motor controlled by switch SW2. The desired fluid pressure is maintained by means of a relief valve 211 connected to a return conduit 216. The control valve assembly V1 to which pressure conduit 212 and return conduit 216 are connected contains a valve spool assembly 220 including a plurality of piston portions defining valve chambers 222, 224 and 226 and provided with a central passage 228 interconnecting valve chambers 222 and 226. The valve spool assembly 220 is normally positioned as shown in FIG. 5 by biasing spring 229, except when solenoid S1 is energized to bias the valve spool assembly 220 to the left. The valve assembly V1 is connected to the cylinder assembly 111 of the linear actuator assembly 29 by means of fluid conduits 112 and 116 for selective delivery of pressurized fluid to cylinder chambers 114 and 118.

The machine cycle by which the grinding wheel 36 is advanced into engagement with a workpiece for a desired grinding operation is initiated by a control circuit including normally closed contacts of control relay CR1, normally closed contacts of a "stop" switch controlled by push button PB3, normally open contacts of a "start" switch controlled by push button PB2, and normally open contacts of control relay CR2, closed when the coil of control relay CR2 is energized to form a holding circuit for the machine cycle after the starting switch is released by releasing push button PB2. It should be understood that the control circuit for initiating the machine cycle illustrated as manually controlled is generally conventional and hence intended to be illustrative only, and it should be further understood that this manually actuated control circuit could be replaced in the instant invention with a fully automatic control circuit for the machine cycle so connected as to be suitably coordinated with the respective circuits characteristic of the instant invention.

Since the apparatus to be controlled by the control circuits described below is designed to function with the grinding wheel 36 rotating at its normal operating speed, the coil of a time delay relay TR2 is connected in parallel with the control circuit for wheel drive motor 31 so that it is energized when switch SW1 is closed to start the motor 31. After a time delay sufficient to allow the grinding wheel 36 to reach its normal speed, the time delay relay TR2 operates to close normally open contacts in each of the control circuits described below so that each of these circuits may thereafter be operated as described. Thus, transient vibrations caused by starting the motor 31 will not trigger operation of the balancing assembly 39.

The control circuit for operating the dynamically actuated balancing assembly 39 semi-automatically with switch SW3 open includes the normally open contacts of a starting switch controlled by push button PB1, normally closed contacts of control relay CR2, initially closed contacts of a time delay relay TR1, the coil of control relay CR1, warning light L, and the coil of time delay relay TR1. The latter circuit also controls a pair of normally open contacts of control relay CR1 arranged so that solenoid S1 of the valve assembly V1 is energized when these normally open contacts are closed.

With the switch SW3 closed, the control circuit for operating balancing assembly 39 can still be operated semi-automatically at the discretion of the operator by push button PB1. In addition, this control circuit will also be operated automatically in response to a given signal from any suitable sensing device arranged to detect a predetermined operating condition. As illustrated in FIG. 5, the condition sensing device comprises a vibration sensitive device mounted upon the wheel slide assembly 13 and provided with a pair of contacts normally open but arranged to be closed by a predetermined condition of vibration. In practice the vibration sensitive device may comprise a Vibration Monitor of the type supplied by the Indikon Company, Inc. of Watertown, Massachusetts, in which a signal proportional to the amplitude of vibration in generated and amplified for transmission to a current sensitive relay with contacts normally open below a predetermined vibration level and closed by an increased current indicative of vibration above the predetermined vibration level. Thus the open contacts included in the schematic representation of the vibration sensitive device in FIG. 5 represent the contacts of the current sensitive relay of the Vibration Monitor or the equivalent portion of any commercially available vibration sensitive device. In any case, the specific details of the vibration sensitive device employed form no part of the instant invention. Hence the simplified schematic representation employed in FIG. 5 is deemed sufficient for describing the instant invention in operative relation to such a device.

The vibration sensitive device is connected in series with one set of normally open contacts of time delay relay TR2 and with a second set of normally closed contacts of time delay relay TR1, and thence through the coil of time delay relay TR3 having one set of normally open contacts connected in parallel with the vibration sensitive device, and finally through manually controlled selector switch SW3. A second set of normally open contacts of time delay relay TR3 is connected across push button PB1 of the control circuit for the balancing operation to provide automatic operation of balancing assembly 39 in the manner described below in connection with the description of the operation of the instant invention.

FIG. 5 also includes a simplified schematic representation of a wheel truing device including a hydraulic cylinder containing a piston with a piston rod projecting therefrom supporting a truing tool holder on the exposed end thereof arranged to receive a truing tool including a diamond point or the like adjustably mounted in the truing tool holder and disposed to be traversed across the peripheral surface of grinding wheel 36 by reciprocation of the truing tool supporting piston within a cylinder in which it is enclosed. As illustrated in FIG. 5, the truing tool is constrained against rotation about the axis of the piston and piston rod on which it is supported by a rod projecting from the cylinder parallel to the piston rod and through a suitable aperture in the truing tool holder mounted on the end of the piston rod. The valve assembly V2 illustrated in FIG. 5 is supplied with pressurized fluid from the pump P and is connected to the actuating cylinder of the wheel truing device and the control circuit for the wheel truing device as illustrated in FIG. 5 includes a normally open manually operable push button PB4 connected in parallel with one set of normally open contacts of control relay CR3 and with an additional normally open set of contacts of TR1, and thence in series with an additional set of normally closed contacts of control relay CR1 and an additional set of normally closed contacts of control relay CR2, then through the coil of control relay CR3 and finally through the normally closed contacts of limit switch LS1 disposed as illustrated schematically in FIG. 5 to be operated by the wheel truing device. The control of the wheel truing device by means of this circuit is effected through a second set of normally open contacts of control relay CR3 connected in series with the solenoid valve S2 incorporated in valve assembly V2 and so disposed as to bias the valve spool of valve assembly V2 to the left against the biasing spring for the valve spool disposed as shown in FIG. 5. Control relay CR3 also includes two sets of normally closed contacts respectively connected in series in the control circuit for operating the balancing assembly 39 and in the control circuit for the machine cycle whereby both of these circuits are deactivated when the control circuit for the wheel truing device is activated. Since the control system for the wheel truing device characterizing the instant invention is suitable for use with various well known types of wheel truing apparatus and since the specific details of the wheel truing device are not considered a part of the instant invention, the schematic representation of the truing device in FIG. 5 is provided in this simplified form as being illustrative of the essential characteristics and generally representative of such devices, rather than in any limiting sense.

For the same reason, the details of the machine cycle have been omitted from the showing in FIG. 5, because they form no part of the instant invention. The device comprising the instant invention is suitable for use with grinding machines having various different well-known wheel feed control systems and with other types of machine tools, as well as devices other than machine tools.

In addition to the normally closed contacts of control relay CR3 effective by energization of CR3 when the truing device control circuit is energized to deactivate the respective circuits for controlling the machine cycle and the balancing operation, the control circuit for the balancing operation and the truing device control circuit are deactivated when the control circuit for the machine cycle is energized by the energization of control relay CR2 which opens normally closed contacts thereof in the balancing control circuit and in the truing device control circuit. Similarly, when the balancing circuit is activated, energization of control relay CR1 opens normally closed contacts thereof in the machine cycle circuit and in the truing device control circuit to deactivate these circuits. Moreover, time delay relay TR2 conected in parallel with the drive motor 31 provides a time delay before the two sets of normally open contacts of this relay close to permit activation of the circuit controlling the balancing means and the circuit including the vibration sensitive device. The time delay for TR2 is selected to constitute a time interval sufficient for the drive motor 31 to come up to its normal operating speed and thereby precludes premature operation of the balancing means after switch SW1 is closed to energize the drive motor 31. Finally, in order to preclude automatic operation of the balancing means in response to transient vibrations or shock loads not representative of an objectionable unbalanced condition of the grinding wheel 36, the circuit including the vibration sensitive device also includes the time delay relay TR3 provided with two sets of normally open contacts. The respective sets of normally open contacts of TR3 are set to close a finite time interval after energization of TR3 of sufficient duration that these contacts will not close in response to transient vibrations or shock loads, but will close in response to a predetermined continuing vibration at an objectionable level due to an unbalanced condition of the grinding wheel 36.

Since semi-automatic operation of the balancing assembly 39 is described in detail in copending application Serial No. 44,382, filed July 21, 1960 by William R. Backer et al., and since the instant invention is related solely to automatic operation of the balancing assembly 39 and coordinated automatic operation of the grinding wheel truing device, the following description of the operation of the instant invention will be directed primarily to automatic operation of the system illustrated schematically in FIG. 5. However, it will be evident from inspection of FIG. 5 that the balancing assembly 39 also may be operated semi-automatically by closing push button PB1.

As noted above, closing switch SW1 starts the wheel drive motor 31 and concurrently energizes time delay relay TR2 adjusted to delay the closing of its respective sets of open contacts until the grinding wheel 36 is rotating at its normal speed. As long as these contacts are held open, the circuit controlling the operation of the balancing assembly 39 cannot be activated either manually by closing push button PB1 or by a signal from the vibration sensitive device. After TR2 times out, the balancing assembly 39 can be actuated manually at the option of the operator by closing push button PB1 with selector switch SW3 either open or closed. In addition, the balancing assembly 39 can be operated automatically by the vibration sensitive device in the manner described below, with selector switch SW3 closed.

If the grinding wheel 36 is out of balance initially or at any subsequent point in its operation sufficiently to produce vibrations in excess of a predetermined level, the normally open contacts illustrated schematically in the vibration sensitive device will be closed and maintained closed for a time interval in excess of the time in which time delay relay TR3 is set to time out and close its respective sets of normally open contacts. One set of contacts of TR3 establishes a holding circuit to maintain TR3 energized and the other set of contacts by-passes push button PB1 to energize the coil of time delay relay TR1, to illuminate a red warning light L, and to energize the coil of control relay CR1. The red warning light L remains illuminated only so long as the coil of relay CR1 is energized. The energization of the coil of control relay CR1 opens its normally closed contacts to lock out the control circuit for the grinding machine cycle and the truing device control circuit, and closes its normally open contacts to energize solenoid S1 in valve assembly V1 to displace the valve spool assembly 220 to the left as shown in FIG. 5, biasing spring 229 so that pressurized fluid passes from pressure conduit 212 to valve chamber 224 and thence through fluid conduit 116 into the cylinder chamber 118 to drive the piston assembly 107 to the left in cylinder assembly 111 as shown in FIGS. 1 and 5. At the same time, fluid expelled from cylinder chamber 114 through fluid conduit 112 passes into valve chamber 226 and through central passage 228 to valve chamber 220 and thence through return conduit 216 to the sump 210. At the predetermined time interval after energization of the coil of time delay relay TR1 sufficient to complete a balancing operation, the normally closed contacts of TR1 are opened deenergizing the coil of control relay CR1 to open the normally open contacts thereof and thereby deenergize the solenoid S1 of valve assembly V1. With solenoid S1 deenergized, the valve spool assembly 220 is returned to the position shown in FIG. 5 so that fluid is released from cylinder chamber 118 and pressurized fluid is delivered to cylinder chamber 114 to return piston assembly 107 to the right as shown in FIGS. 1 and 5.

When the piston assembly 107 of the linear actuator assembly 29 is displaced to the left in the manner described above, the spring rod 101 displaces spindle portion 25 longitudinally relative to spindle portion 24 to disengage tapered surface 27 from tapered surface 26. This relative longitudinal displacement continues until spindle portions 24 and 25 reach the relative positions illustrated in FIG. 2 in which the left hand end of spring rod 101 is free to oscillate about the normal axis of rotation in response to an unbalanced condition of the rotating element supported thereby, illustrated in FIG. 2 as a grinding wheel 36. Continued displacement of the spring rod 101 by the piston assembly 107 moves spindle portion 25 ultimately to the position represented by the phantom line on the left hand side of FIG. 2. However, the lengths of the respective flexible cables 193 and the adjustments of the respective sleeves 195 cooperating therewith are such that the locking ring 181 is constrained from displacement from the position in which it is shown in FIG. 2. Consequently, the final displacement of the spring rod 101 moves the pendulum locating pins 176, 176' and 176'' into the position relative to the annular serrated portion 182 illustrated in the solid line portions of FIG. 3, constituting an exaggerated representation of the relative displacement of these parts. With the respective locating pins disengaged from the locking ring 181, the pendulum weights 175 are free to rotate about their respective anti-friction bearing assemblies 171 to seek the position in which they offset any unbalance in the grinding wheel 36. The manner in which the respective pendulum weights 175 coact to offset an unbalanced condition of a rotating element such as the grinding wheel 36 illustrated will not be discussed in detail herein since this principle is well known in the art, as indicated in Thearle Patent No. 1,967,163 and elsewhere in the literature. Instead, it is considered sufficient to note that the respective pendulum weights 175 will seek appropriate angular orientations about the elongated bearing surface 159 of the spring rod 101 such that they will compensate for an unbalanced condition, rotating with and remaining relatively fixed in their angular relation to the rotating element with which they coact.

In order to secure the pendulum weights 175 in the balanced disposition, the sequence described above is reversed. That is, when the solenoid S1 is deenergized and the piston assembly 107 of the linear actuator assembly 29 is displaced to the right, as described above, the initial displacement of the spring rod 101 brings the ends of the respective pendulum locating pins 176, 176' and 176'' into inter-fitting engagement with the annular serrated portion 182 of locking ring 181. Thus, the respective pendulum weights 175 are constrained against rotation relative to the rotating element with which they coact, even when the drive motor 31 is deenergized so that the rotating element such as a grinding wheel 36 comes to rest. Continued displacement of the spring rod 101 to the right first brings the chamfered edge 152 into engagement with the chamfered face 154 of the cylindrical seat 153 to guide boss 151 into engagement with seat 153 to constrain the spindle portion 25 in substantial axial alignment with spindle portion 24. Thereafter, continued displacement of the spring rod 101 to the right brings the internal tapered surface 27 of spindle portion 25 into inter-fitting engagement with the external tapered surface 26 of spindle portion 24 to position the respective spindle portions in precise axial alignment.

Recalling that solenoid S1 of valve assembly V1 is deenergized when time delay relay TR1 times out opening a set of normally closed contacts to deenergize the coil of control relay CR1, an additional set of normally closed contacts of CR1 illustrated in FIG. 5 is closed simultaneously to set up the circuit controlling the wheel truing device and the instantaneous closing of a set of normally open contacts of TR1 by-passes push button PB4 to automatically initiate a cycle of operation of the truing device by energizing the coil of control relay CR3. The closing of one set of normally open contacts of CR3 establishes a holding circuit for the coil of CR3 and the closing of the other set of normally open contacts of CR3 energizes solenoid S2 in valve assembly V2 to bias its valve spool to the left to admit pressurized fluid to the right hand end of the truing device actuating cylinder. The displacement of the piston to the left within this actuating cylinder causes displacement of the truing tool to the left to traverse the surface of the grinding wheel 36. As the piston approaches the end of its stroke, the truing tool holder engages limit switch LS1 to open its normally closed contacts and thereby interrupt the holding circuit for the coil CR3. With CR3 deenergized, the control circuit for the truing device is deactivated and solenoid S2 is deenergized so that the valve spool is displaced to the right in valve assembly V2 by the biasing spring. With valve assembly V2 so disposed, pressurized fluid is admitted to the left hand end of the actuating cylinder of the truing device to return the truing tool to the position illustrated in FIG. 5 after it once again traverses the surface of the grinding wheel 36.

With selector switch SW3 closed to provide for automatic operation of balancing assembly 39, the balancing assembly 39 can still be actuated manually by closing push button PB1 as noted above. In addition, the system illustrated in FIG. 5 is so arranged that the operation of the balancing assembly 39 is automatically followed by operation of the wheel truing device in the manner described above, even when operation of the balancing assembly 39 is initiated manually by closing push button PB1. Finally, operation of the truing device can be initiated manually independent of operation of the balancing assembly 39 by closing normally open push button PB4.

While the condition sensing device of the instant invention has been illustrated and described as a vibration sensitive device for purposes of illustration, it should be clearly evident that equally effective results can be achieved by substituting other suitable condition sensing devices of well known configurations. For example, the condition sensing device may comprise a conventional timing mechanism set to close a pair of contacts at predetermined time intervals. Alternatively, the condition sensing device may comprise a conventional counter set to close a pair of contacts after a predetermined number of repetitive operations such as a given number of operations of the machine cycle in the illustrative embodiment of the instant invention. Where such alternative condition sensing means are employed and elsewhere when there is no danger of the intrusion of spurious transient signals which might initiate an unnecessary balancing operation, the time delay relay TR3 may be replaced by a control relay immediately effective to actuate the control circuit for the balancing assembly 39 and to establish a holding circuit for the coil of such a control relay by closing the normally open contacts corresponding to the respective normally open contacts of TR3.

Thus the instant invention provides means automatically operable in sequence first to initiate operation of automatic balancing means for a rotating object effective to balance the object relative to its axis of rotation while it is rotating, and then to initiate a conditioning operation on the rotating object, if necessary, upon completion of the balancing operation. For example, in the case of grinding machines, it is generally necessary in order to optionize the performance of the grinding wheel after it is balanced by suitable automatically operable means such as that illustrated and described herein.

While the instant invention is illustrated as it applies to one embodiment of the grinding machine, it is equally applicable to other arrangements for grinding machines including the alternative embodiment illustrated in FIG. 6 of copending application Serial No. 44,382 referred above. Moreover, the teachings of the instant invention are equally applicable to rotating tools incorporated in other types of machine tools than grinding machines. Finally, the instant invention may be embodied in diverse other applications other than machine tool installations.

From consideration of the description of the instant invention provided herein with respect to the preferred embodiment of this invention, it will be apparent that the various objects set forth hereinabove may be achieved with many thoroughly practical advantages in diverse applications of the teachings of the instant invention. Hence, since the instant invention may be incorporated in many practical embodiments thereof and since many changes might be made in the embodiment thereof described above within the scope of the appended claims, it is to be understood that all matter hereinbefore set forth and shown in the accompanying drawings is to be interpreted as illustive only and not in a limiting sense.

What is claimed is:

1. In apparatus including a rotating element, a spindle assembly selectively effective in a first condition to support the rotating element for rotation about a fixed predetermined axis at a speed below its critical speed and effective in a second condition to support the rotating element for rotation at a speed above its critical speed, balancing means mounted with the rotating element on said spindle assembly including releasably secured self-positioning weights secured against rotation relative to the rotating element when said spindle assembly is in its first condition and freely rotatable concentric of the rotating element when said spindle assembly is in its second condition, actuating means connected to said spindle assembly cyclically operable according to a predetermined sequence to transfer said spindle assembly from its first condition to its second condition, to release the self-positioning weights of said balancing means, to secure the self-positioning weights of said balancing means when a balancing operation is completed, and to return said spindle assembly from its second condiiton to its first condition, control means activated by a predetermined critical signal and thereafter operable independent of subsequent signals during a given cycle to operate said actuating means according to its predetermined sequence of operation, and sensing means connected to said control means and operable in response to a predetermined operating condition of the apparatus to produce a critical signal for activating said control means.

2. In a machine tool assembly including a rotating tool, a spindle assembly selectively effective in a first condition to support the rotating tool for rotation about a fixed predetermined axis at a speed below its critical speed during each machining operation and effective in a second condition to support the rotating tool for rotation at a speed above its critical speed during each balancing operation, balancing means mounted concentric with the rotating tool on said spindle assembly including a plurality of releasably secured self-positioning weights secured against rotation relative to the rotating tool when said spindle assembly is in its first condition and freely rotatable relative to the rotating tool when said spindle assembly is in its second condition, actuating means operatively connected to said spindle assembly operable according to a predetermined sequence to convert said spindle assembly from its first condition to its second condition, to release the self-positioning weights of said balancing means, to secure the self-positioning weights of said balancing means when a balancing operation is completed, and to return said spindle assembly from its second condition to its first condition, self-sustaining control means activated by a predetermined critical signal and thereafter operable to cycle said actuating means according to its predetermined sequence of operation independent of subsequent signal during a given cycle, and sensing means connected to said control means and operable in response to a predetermined operating condition of the machine tool assembly to produce a critical signal for activating said control means.

3. A device as described in claim 2 wherein, said control means includes means activated during each machining operation to render said control means inoperative during each machining operation and thereby preclude operation of said actuating means throughout each machining operation.

4. In a grinding machine including a grinding wheel, a grinding wheel spindle assembly selectively operable in a first condition to support the grinding wheel rigidly for rotation about a fixed predetermined axis at a speed below its critical speed during grinding and truing operations and effective in a second condition to support the grinding wheel resiliently for radially yieldable rotation at a speed above its critical speed during balancing operations, balancing means mounted concentrically of the grinding wheel on said spindle assembly including releasably secured eccentrically disposed self-positioning weights and locking means by which the self-positioning weights are secured against rotation relative to the grinding wheel when said spindle assembly is in its first condition and from which the self-positioning weights are released for free rotation relative to the grinding wheel when said spindle assembly is in its second condition, first actuating means operatively connected to said spindle assembly cyclically operable according to the predetermined sequence to transfer said spindle assembly from its first condition to its second condition, to release the self-positioning weights from the locking means, to secure the self-positioning weights with the locking means when a balancing operation is completed, and to return said spindle assembly from its second condition to its first condition, grinding wheel truing means operable to true the grinding wheel, second actuating means for said truing means, control means activated by a predetermined critical signal and thereafter operable independent of subsequent signals during a given cycle to operate said first actuating means according to its predetermined sequence of operation and to operate said second actuating means to true the grinding wheel when the grinding wheel has been balanced by said balancing means, and sensing means connected to said control means operable in response to a predetermined operating condition of the grinding machine to produce a critical signal for activating said control means.

5. In a grinding machine including a grinding wheel mounted upon a spindle assembly for rotation about a fixed predetermined axis during grinding operations, balancing means for the grinding wheel including self-positioning weights secured for rotation with the grinding wheel during grinding and truing operations and released for rotation relative to the grinding wheel when the grinding wheel is supported for rotation above its critical speed during a balancing operation, a first actuating means cyclically operable in a first sense to support the grinding wheel for a balancing operation and to release the weights during a balancing operation and in a second sense to secure the weights and support the grinding wheel for a grinding operation, truing means for the grinding wheel and a second actuating means for the truing means; a control means for a grinding wheel conditioning cycle operable to cycle the first actuating means and to operate the second actuating means in a predetermined timed relation to the first actuating means so that the truing operation is initiated immediately after the balancing operation is completed, and sensing means connected to said control means operable in response to a critical change in a predetermined operating characteristic of the grinding machine to actuate said control means so as to produce a wheel balancing operation followed by a wheel truing operation together effective to condition the grinding wheel properly for a subseqeunt grinding operation.

6. In a device as described in claim 5, activating means incorporated in said control means operable to initiate a grinding operation upon completion of a grinding wheel conditioning cycle and operable during each grinding operation to preclude operation of the first and the second actuating means throughout each grinding operation, means operable to render said activating means and the second actuating means inoperative during a predetermined portion of the cyclic operation of the first actuating means, and means operable while the second actuating means is operating to render said actuating means inoperative and to preclude the initiation of a cyclic operation of the first actuating means.

7. In a machine tool assembly including a rotating cutting tool mounted upon a spindle assembly for rotation below its critical speed about a fixed predetermined axis during cutting operations and for rotation above its critical speed during balancing operations, balancing means for the cutting tool secured for rotation in fixed relation to the cutting tool during cutting operations and released for automatic self-positioning movement relative to the cutting tool while the cutting tool is supported for rotation above its critical speed so as to perform a balancing operation an actuating means cyclically operable initially in a first sense to so support the cutting tool that the cutting tool is rotated above its critical speed for a balancing operation and then to release the balancing means and thereafter in a second sense to secure the balancing means after a balancing operation and then to so support the cutting tool that the cutting tool is rotated below its critical speed for a cutting operation, control means activated by a triggering signal and thereafter operable independent of subsequent signals during a given balancing operation to operate said actuating means first in a first sense and then in a second sense to complete a balancing operation, and sensing means connected to said control means operable in response to a predetermined critical change in the operating condition of the machine tool assembly to produce a triggering signal and thereby activate said control means.

References Cited in the file of this patent

UNITED STATES PATENTS

| | | |
|---|---|---|
| 1,967,163 | Thearle | July 17, 1934 |
| 2,534,268 | Kahn et al. | Dec. 19, 1950 |
| 2,534,269 | Kahn et al. | Dec. 19, 1950 |
| 2,814,944 | Brown | Dec. 3, 1957 |
| 2,834,570 | Harrison | May 13, 1958 |
| 2,882,745 | Comstock | Apr. 21, 1959 |
| 2,915,918 | Comstock et al. | Dec. 8, 1959 |
| 2,938,703 | Dietz | May 31, 1960 |